United States Patent

[11] 3,571,730

[72] Inventor George T. Webb
Lexington, Ky.
[21] Appl. No. 744,753
[22] Filed July 15, 1968
[45] Patented Mar. 23, 1971
[73] Assignee International Business Machines Corporation
Armonk, N.Y.

[54] SELF-CLOCKED BINARY DATA DETECTION SYSTEM WITH NOISE REJECTION
5 Claims, 2 Drawing Figs.

[52] U.S. Cl. .......... 328/117, 307/235, 328/63, 328/165
[51] Int. Cl. .......... H03k 5/20
[50] Field of Search .......... 328/115-8, 163, 165, 63; 307/235

[56] References Cited
UNITED STATES PATENTS
3,222,603 12/1965 Dustin .......... 328/63X
3,244,986 4/1966 Rumble .......... 328/118X
3,437,834 4/1969 Schwartz .......... 328/165X

*Primary Examiner*—Donald D. Forrer
*Assistant Examiner*—John Zazworsky
*Attorneys*—Hanifin and Jancin and John W. Girvin, Jr.

ABSTRACT: A self-clocked binary data detection system employing multiple threshold level detection of the differentiated read-back signal. A first threshold level detector detects the zero crossovers of the differentiated read-back signal which correspond to the peaks of the read-back signal to provide the self-clocking and data information. A second threshold level detector determines when the signal amplitude of the differentiated read-back signal is above a certain threshold level. An error is indicated if the second threshold detector fails to indicate that the signal amplitude has reached the second threshold level within a predetermined time after the first threshold detector provides an output signal. The output signal of the second threshold detector is latched on and is reset by the next subsequent zero crossover detection by the first detector. This enables the predetermined time interval to be relatively large with respect to the period of the wave form, therefor insuring low and high frequency detection compatibility with weak input signals.

INVENTOR.
GEORGE T. WEBB

BY John W Girvin, Jr.

ATTORNEY.

SELF-CLOCKED BINARY DATA DETECTION SYSTEM WITH NOISE REJECTION

CROSS-REFERENCES TO RELATED APPLICATIONS

The following applications are all assigned the same assignee as the present application.

U.S. Pat. application Ser. No. 697,735, entitled "Data Reading, Recording, and Positioning System," Douglas E. Clancy, George W. Hobgood, Jr., and Frederick T. May, inventors, filed Jan. 15, 1968.

U.S. Pat. application Ser. No. 697,717, entitled "Detection and Error Checking System For Binary Data," Cecil Wayne Cox and Frederick T. May, inventors, filed Jan. 15, 1968.

BRIEF BACKGROUND OF INVENTION

1. Field

The invention relates to self-clocked binary data detection systems and, more particularly, to a method and means for accurately separating self-clocking data bits from noise signals occurring between blocks of information.

2. Description of the Prior Art

Prior art devices for reproducing magnetically recorded binary information as the magnetic medium having the information recorded thereon passes a pickup head are well known. Various techniques have been developed for representing and magnetically recording the binary information. With increased data processing speeds and the resulting need for higher density magnetic recording, two such techniques, phase modulation and frequency modulation, are becoming increasingly popular because of their wider timing tolerances and noise rejection reliability. In a binary data detection system using phase modulation techniques, each binary bit cell experiences a change in flux polarity at a predetermined point (usually the center or leading edge) of the bit cell. The direction of the polarity change represents the binary information. For example, a binary 1 would be represented by a change from a negative magnetization to a positive magnetization at the predetermined location and a binary 0 would be represented by a change in magnetization from a positive magnetization to a negative magnetization. Such a technique is shown in U.S. Pat. 2,734,186, entitled "Magnetic Storage by F. C. Williams, issued Feb. 7, 1956.

The second recording technique, closely related to the phase modulation technique, is called "Frequency Modulation." Frequency modulation is like phase modulation in that a magnetic flux polarity reversal always takes place at periodic intervals. The distinction between the two techniques is the manner in which the binary information is caused to control the time in which the flux reversals take place. A binary 1, for example, would be recorded by causing two adjacent flux reversals to have a first predetermined period. A binary 0 would be represented by adjacent flux reversals having a second predetermined period half as long as the first period. A detection system must be capable of distinguishing between adjacent flux reversals of the first predetermined period or adjacent flux reversals of the second predetermined period.

A desirable feature of the phase modulation and frequency modulation techniques is that self-clocking of the binary information can be achieved. Since each binary bit cell has a periodic change in state, the change will be detected at the same frequency as the binary information originally recorded. That is, clock signals are derived from each binary bit cell which are utilized to sample the next binary bit cell and so on. With such a self-clocking system, it is extremely important that the clock signals occur periodically within a narrow tolerance range, otherwise, the self-clocking information is lost. At very high recording densities, mechanical tolerances are critical so that variations in speed of the record medium relative to the playback head can cause rapid time displacement of the reproduced electrical signals such that the self-clocking information is lost. Further, in high density recording, the spacing between the reproducing transducer and the record medium becomes critical. Irregularities in the record medium or matter buildup on the transducer may cause excessive separation between the medium and the head such that a rapid time displacement of the reproduced electrical signal is again effected. This is especially true with phase modulation techniques where certain binary sequences produce flux changes at a higher frequency than other binary sequences resulting in well known time displacement shifts.

In order to overcome the problems created by the time displacement of the reproduced electrical signal, the prior art has recognized that the signal peaks of the read-back signal do not shift to the extent of the remainder of the signal. Therefore, the signal peaks of the read-back signal are detected to supply the data and clocking information. Usually this is done by first differentiating the read-back signal to produce a signal train whose amplitude at each point is proportional to the rate of change of amplitude of the original read-back signal. The peaks of the read-back signal then correspond to the zero crossovers of the differentiated read-back signal and the self-clocking information is derived from each zero crossover which can be readily detected. However, such detection systems are highly susceptible to detecting noise existing between blocks of information as data since the noise signals contain zero crossovers which may occur at the data rate. Thus, in large scale computers where large blocks of information are recorded, each block of information is preceded by a predetermined sequence of binary data bits, the sequence of which is checked to insure that data is being read rather than noise. These data bits are also utilized to synchronize the self-clock and insure its proper phase relationship with the forthcoming information block. While such an approach is adequate for large scale devices, it is inadequate where only short blocks of information, for example, single data characters, are to be recorded since space requirements prohibit the recording of long trains of synchronizing bits prior to the recording of each character.

The prior art approach to the sensing of short blocks of information such as characters has been to detect the differentiated read-back signal once it achieves a predetermined minimum threshold value. The threshold value is chosen to be greater than the noise level expected. While this method has proved adequate when timing tracks are utilized in conjunction with the data sensing, it is inadequate for self-clocked type of information because the point in time at which the signal reaches the predetermined level varies with the information recorded and with the transducer to medium spacing thereby making the self-clock quite unstable.

SUMMARY

In order to overcome the above problems and shortcomings of the prior art and to provide a self-clocked binary data detection system for detecting short blocks of information while still maintaining a high degree of noise rejection, the data detection system of the present invention is provided with a unique multiple threshold level detection scheme wherein the zero crossovers of the differentiated read-back signal are utilized to provide self-clocking information and wherein a second threshold level is established for noise rejection. Since each data block is preceded by two flux reversals of known direction and frequency, the multiple threshold level detection system can readily be utilized to reject noise signals occurring between blocks of information.

The foregoing and other features and advantages of the invention will be apparent more particular description of the preferred embodiment of the invention as illustrated in the accompanying drawings.

Figure 1:
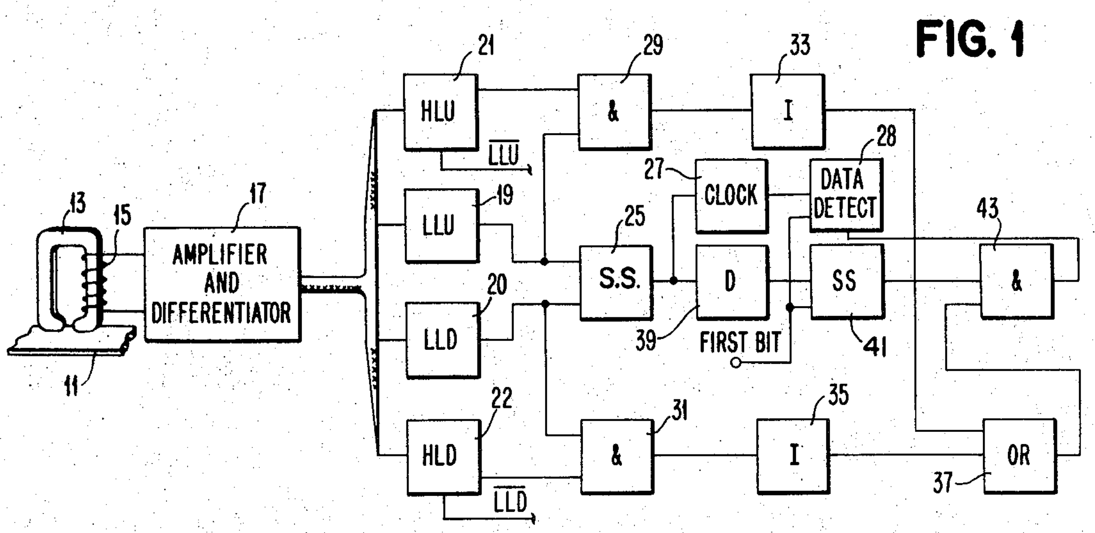
FIG. 1 is a schematic block diagram of the binary data detection system of the present invention.

Referring now to FIG. 1, a logic block diagram of the self-clocked binary data detection system of the present invention is depicted. The logic blocks are responsive to signals generated as a magnetic medium 11 containing binary information in the form of flux reversals is moved relative to the magnetic transducer 13. The voltage generated across the winding 15 of the transducer as the binary data passes the transducer is supplied to the input terminals of a differential amplifier and differentiator circuit 17. This circuit differentially amplifies the read-back signal supplied by the transducer 13 and differentiates it. Thus, the differential amplifier and differentiator circuit 17 supplies an output signal which is the differentiated read-back signal to the level detection circuits 19 through 22.

The level detection circuits 19 and 20 are set to provide output signals whenever the input signal is respectively slightly positive or slightly negative and are hereinafter referred to as low level (LL) detection circuits. These low level detection circuits thus provide an output signal which closely corresponds to the zero crossover points of the differentiated read-back signal. The output signal is provided only so long as the differentiated read-back signal is at or exceeds their respective threshold levels. Level detection circuits 21 and 22 provide an output signal whenever the differentiated read-back signal reaches a second threshold level, each such level being greater than the threshold level of its corresponding low level detection circuits 19 and 20 respectively. These level detection circuits are hereinafter referred to as high level (HL) detection circuits. Once the differentiated read-back signal reaches the threshold level of the high level the high level detection circuits 21 or 22, it causes the high level detection circuit to provide an output signal which is latched on and which remains on until its corresponding low level detection circuit turns off. Thus, the high level detection circuit performs the functions of level detecting the input signal and providing an output signal until the input signal reaches a second lower level. This circuit could comprise a conventional threshold detection circuit and a conventional resettable latch circuit responsive to the output signal of the threshold detection circuit for providing an output signal until reset with a signal from the low level detection circuit. Such a resetting function is indicated by the lines LLU and LLD indicating, respectively, the absence of a signal output from the low level upper (LLU) low level down (LLD) circuits. Summarizing, the differential amplifier and differentiating circuit 17 provides an output signal to the level detection circuits 19–22. Level detection circuit 19 turns on whenever the differentiated read-back signal goes positive and reaches a first minimum threshold level. The level detection circuit 19 continues to provide an output signal so long as the level of the differentiated read-back signal is greater than its threshold value. Level detection circuit 21 provides an output signal when the level of the differentiated read-back signal reaches a second positive threshold level greater than the threshold level detected by level detection circuit 19. Level detection circuit 21 continues to provide an output signal even though the level of the differentiated read-back signal may go below its threshold level until it is reset when the differentiated read-back signal goes below the threshold level detected by level detection circuit 19. Level detection circuits 20 and 22 operate in a similar manner when the differentiated read-back signal goes negative.

Since the output signals of the low level detection circuits 19 and 20 closely correspond to the zero crossover points of the differentiated read-back signal, these output signals are utilized to generate the self-clocking information for either a frequency encoded or a phase encoded data recording technique. Thus, the output signals of the level detection circuits 19 and 20 are supplied to a single shot circuit 25 and thence to a clock circuit 27. The output signal supplied by the single shot circuit 25 is coincident with the leading edge of the output signals of the low level detection circuits and hence with each zero crossover of the differentiated read-back signal. The output signal of the clock circuit 27 may thereafter be utilized as a synchronizing signal for a phase encoded detection system as described in the aforereferenced copending application Ser. No. 697,717 of Cecil Wayne Cox et. al. to self-clock the information or by an appropriate frequency encoded detection system. Such a system is denoted by data detect circuit 28.

As heretofore described, it is desirous to separate low level noise signals occurring between information blocks from the data contained in the information blocks. Since the level noise signals occurring between information blocks from the data contained in the information blocks. Since the low level noise signals would only activate the low level detectors 19 and 20, the absence of the activation of the high level detector circuits 21 and 22 is utilized to indicate the presence of noise and the absence of data. Hence, when a data signal is present, both a low level detection circuit and its corresponding high level level detection circuit will provide an output signal. Accordingly, coincidence circuits 29 and 31 are respectively responsive to the level detection circuits 19 and 21 and 20 and 22 to provide an output signal whenever there is coincidence between the output signals of a low level detection circuit and its corresponding high level detection circuit. The output signals of the coincidence circuits 29 and 31 are logically inverted respectively by inverter circuits 33 and 35 each of which provides an output signal indicative of the noncoincidence of signals appearing at the outputs of its corresponding low level detector and high level detector circuits.

The output signals of the inverter circuits 33 and 35 are supplied to an OR circuit 37 which provides an output signal indicating that there is noncoincidence between the output signals of a low level detection circuit and its corresponding high level detection circuit. As is apparent, whenever there is noncoincidence between the low level detector and its corresponding high level detector, it is indicative that the low level detector has detected a signal while the high level detector has failed to detect a signal since a signal, whether it be representative of noise or data, must first pass the low threshold level prior to passing the high threshold level. Also, the high level detector detects the signal at a point in time later than the low level detector. Thus, it is necessary to sample the output signal of OR circuit 37 at a point in time displaced from the time that the low level detector circuit provides an output signal. Therefore, the output signal of single shot circuit 25 representative of detection by either low level detection circuit 19 or low level detection circuit 20 is delayed by delay 39 and then supplied to a single shot. The single shot 41 provides an output signal of short duration to sample the output signal of the OR circuit 37 at a point in time later than the time that the low level detector circuit provides an output signal. If there is noncoincidence between the low level detector and its corresponding high level detector at the time when the single shot 41 provides an output signal, the coincidence circuit 43 is gated providing a signal indicative of noise error. The noise error signal may be utilized to reset the data detection circuit 28 thereby indicating that data was not present and that the low level detection circuit was triggered by noise or that the data wave form sensed did not correspond to a minimum standard which insures proper self-clocking of the information. Since the high level detection circuit is latched in its On condition, once it is set so long as its corresponding low level detection circuit remains on, the noise error signal provided by coincidence circuit 43 is indicative that the signal level never reached the threshold level of the high level detection circuit during the time interval defined by the delay 39.

Figure 2:
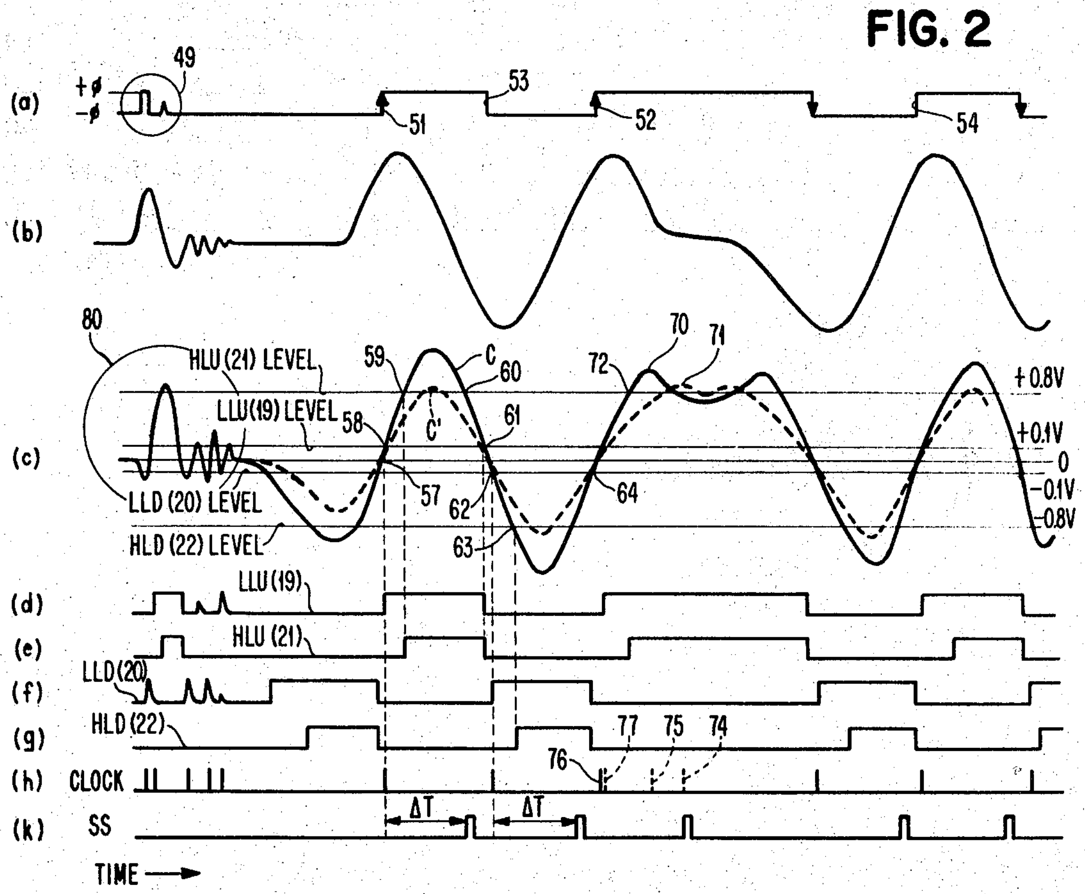
FIG. 2 is a timing diagram of the output signals of various logic blocks of FIG. 1 with respect to a typical data character.

Referring now to FIG. 2, and more particularly to waveform *a* thereof, a signal wave form representative of a portion of a typical character of information as it is recorded on a magnetic media is depicted. This wave form is representative of a character encoded according to the well known phase encoded technique wherein binary information is represented by a change from one binary state to another, binary 1 information arbitrarily being defined as a positive going change while binary 0 information arbitrarily being defined as a negative going change. When recording on a magnetic media, these changes are in the form of flux changes; that is, the magnetic media is saturated first in one direction and then in another with the boundary between two such areas being detected to represent the information content.

As can be seen, certain flux changes denoted by arrows, for example, arrows 51 and 52, occur at constant time intervals thereby providing, upon proper detection, a train of clock pulses which can be utilized to detect the information content of subsequent occurring flux reversals. These flux reversals denoted by arrows will hereinafter be referred to as data flux reversals.

When two adjacent data bits have the same binary value, it is necessary to reverse the flux at a point intermediate the two adjacent data flux reversals which represent the two adjacent bits. An example of such corrective flux reversals is depicted at 53 and 54. It is necessary that these corrective flux reversals not be recognized as data or clocking information.

Each character thus recorded on the magnetic media consists of a predetermined number of data flux reversals and a number of corrective flux reversals dependent upon the sequence and sense of the data flux reversals. In the system described in the aforereferenced copending application Ser. No. 697,717 of Cecil Wayne Cox, et. al., each character consists of nine data flux reversals, seven containing character identity information and two containing start and parity information. Each data character is recorded with a maximum of 562 flux changes per inch and the media is moved relative to the transducer at a speed of 35 inches per second thereby effecting a 9.84 kHz. cycle rate of flux reversals for the high frequency component of the waveform. Further, each character is separated from the preceding and subsequent character by an intercharacter gap. The recording of such a sequence of characters is described in the aforereferenced copending application Ser. No. 697,735 of Douglas E. Clancy et. al. As depicted by noise signal 49, scratches and discontinuities in the media exist between characters which cause the flux of the media between characters to vary.

Referring now to waveform *b*, the read-back signal is depicted. This signal represents the voltage induced in winding 15 of the magnetic transducer 13 of FIG. 1 as the flux changes as depicted in waveform *a* which are recorded on the magnetic medium 11 of FIG. 1 pass the transducer.

Waveform *c* depicts the read-back signal of waveform *b* after it is differentiated by the differential amplifier and differentiating circuit 17 of FIG. 1. Waveform *c'* (shown in broken line) depicts the differentiated read-back signal when there is poor media to transducer contact. The threshold levels of the level detection circuits 19—22 of FIG. 1 are also depicted with respect to the waveforms *c* and *c'*. As can be seen by observing waveform *c*, when the first data flux reversal of waveform *a* is sensed, the differentiated read-back signal first goes negative and then positive. The crossing of the zero level at point 57 as the wave waveform *c* goes from negative to positive represents the clocking and data information corresponding to the flux reversal of the media which it is desirous to detect.

The output signal of the low level up (LLU) detector circuit 19 of FIG. 1 is depicted by waveform *d* and, since it is set to detect a slightly positive going waveform it produces an output signal when the waveform *c* reaches point 58. This output signal is utilized by the system for self-clocking and data information. Point 58 is only slightly displaced in time from the true crossover point 57 and therefore no appreciable delay of the clocking information is introduced into the system. Waveform *c* next crosses the threshold level of the high level up (HLU) detector 21 of FIG. 1 at point 59. This gates on the high level detector 21, the output wave form of which is depicted by waveform *e*. As shown by waveform *e*, the high level up detector remains on even though the differentiated read-back signal *c* falls below its threshold value at point 60 and remains on until waveform *c* passes below the threshold level of the low level up detector at point 61. At this time both the low level up detector 19 and the high level up detector 21 are reset as depicted in waveforms *d* and *e* respectively. The waveform *c* then goes negative passing the threshold value of low level down (LLD) detector 20 at point 62 which indicates that there has been a zero crossover of the waveform *c*. The output signal of the low level down detector as depicted by waveform *f* goes positive when waveform *c* reaches point 62. Thereafter, the differentiated read-back signal *c* passes the threshold level of the high level down (HLD) level detector at point 63 causing the high level down detector circuit 22 of FIG. 1 to turn on as depicted in waveform *g*. As shown by waveforms *f* and *g*, both the low level down detector 20 and the high level down detector 22 are reset when the waveform *c* reaches point 64 thereby going below the threshold level of the low level down detector 20.

Waveform *h* depicts the input signal provided by single shot circuit 25 to clock circuit 27 of FIG. 1. This signal is utilized by the clock circuit to self-clock the data information contained on the magnetic media and, as can be seen, closely corresponds to the zero crossovers of the differentiated read-back signal of waveform *c*. Waveform *k* depicts the output of single shot 41 of FIG. 1. Essentially, it is a pulse of fixed duration as defined by the single shot period which is delayed by a time $\Delta T$ from the occurrence of a clock pulse signal appearing at the output of single shot circuit 25 of FIG. 1. As described above with respect to FIG. 1, the pulses of waveform *k* are utilized to sample the output signals of a high level detector and its corresponding low level detector to insure that they are coincident.

Referring again to wave form *c*, it will be seen that in each instance the differentiated read-back signal reaches the upper threshold level long before it is sampled by the single shot pulse of waveform *k*. In fact, the waveform *c* may actually be below the high level threshold when the coincidence of the high level detector and the low level detector are sampled. However, since the high level detector is latched in an On condition until its corresponding low level detector is reset, as depicted by lines LLU and LLD of FIG. 1 coincidence is indicated. The reason for delaying this sampling interval to such a great extent will become apparent from an examination of waveform *c'*.

Referring now to waveform *c'*, a differentiated read-back signal is depicted wherein there is poor contact between the transducer and the magnetic media, thereby causing a weak read-back signal and a poorly timed differentiated read-back signal. The loss in signal strength of the read-back signal expressed in db. is approximated by the equation ($\text{loss}_{(db)}=55d/\lambda$) where $d$ represents the separation of the media from the transducer and $\lambda$ represents the wave length of the signal. Thus, high frequency signals are more sharply attenuated. It should be noted at this point that waveform *c'* represents the worst case data which it is desirous to detect with a peak swing of approximately 0.8 volts which corresponds to the upper threshold level. Waveform *c* is also representative of a signal with poor media to transducer contact producing a signal with a peak swing of 1 volt. When there is absolute contact between the media and transducer, the high frequency signals produce approximately a 4-volt peak voltage and the low frequency signals produce approximately a 3-volt peak voltage at the output of the amplifier and differentiator circuit 17 of FIG. 1. As can be seen, the waveform *c'* has approximately the same zero crossover points as the waveform *c*. This is because the peaks of the read-back signal shift to a lesser extent than the remainder of the read-back signal when there is poor media to transducer contact. Thus, the clocking information which is obtained from the zero crossovers is approximately the same whether or not the media is in good contact with the transducer. However, the peaks of the differentiated read-back signal are smaller in amplitude and also are shifted as shown by comparing waveform *c* with respect to waveform *c'* at points 70 and 71. The shift of the peaks of the differentiated read-back signal is particularly acute when a low frequency signal follows a high frequency signal as at 70 and 71. This occurs in a phase encoded system whenever two similar binary information bits are followed by an unlike binary information bit. By delaying the sampling interval by a sufficiently great time period $\Delta T$, the waveform $c'$ reaches the high threshold level of the threshold detection circuit 21 in time for the signal to be properly recognized as data.

Prior art detection devices which utilized a relatively high threshold level to eliminate noise recognition in order to detect the data would indicate failure if the waveform $c'$ were presented to such a detection circuit. This is because the synchronizing pulse would be generated at point 71 if the media was out of contact with the head as opposed to point 72 if the media were in more intimate contact with the transducer. The synchronizing pulses that would be generated are shown by dotted lines 74 and 75 on the clock waveform $h$. It can be seen that there is a considerable time differential between the time at which the clock pulse occurs when the media is in contact as opposed to the time at which the clock pulse occurs when the media is out of contact. Such a time differential cannot be tolerated with a self-clocking system since a late occurrence of the clocking and data pulse could be misinterpreted to represent a corrective flux reversal or vice versa. However, by utilizing the zero crossover point, the synchronizing pulse occurs at approximately the same point in time regardless of the head to media contact. Thus, the clock pulse occurring as a result of the zero crossover at point 64 is depicted in waveform $h$ at 76 for waveform $c$ and at 77 for waveform $c'$. It can readily be seen that the time difference between the occurrence of clock pulses 76 and 77 is of much shorter duration than that between clock pulses 74 and 75.

As heretofore described, prior art devices utilize the zero crossover information to generate clocking information. However, those devices which utilize such a system must be able to reject crossovers effected by noise occurring between the blocks of information. Such crossovers are depicted generally at 80 on waveform $c$ and are occasioned by discontinuities and scratches on the record media. These scratches and discontinuities are particularly apparent whenever the media is handled by the operator.

In order to reject such noise, the detection system of the present invention does not detect unless the noise reaches the upper detection level within a predetermined time period. Since most noise signals are of low amplitude and never reach the upper threshold level, they can be immediately distinguished from data since they fail to reach the upper threshold level within the predetermined time period. Those noise signals which do reach the upper detection level are generally of a high frequency and do not remain at the high threshold level for a long duration. Thus, it is highly probable that there is a lack of continuity between the levels of the two threshold detectors when the signal is sampled.

Referring once again to FIG. 1, it can be seen that the single shot circuit 41 is gated by a first bit data line. The first bit data line signal is supplied by circuitry (not shown) which detects the presence of the first information bit. This circuitry takes advantage of the fact that the first information bit of a block of data is always a positive going bit. Referring to waveforms $c$ and $c'$, it can be seen that the differentiated read-back signal of the positive going bit is always of the general shape of a negative going wave form followed by a positive going waveform. The negative going waveform always crosses the threshold voltage level of the low level down detector 20 of FIG. 1 and, within half a bit interval later, crosses the threshold level of the low level up detector 19 and thereafter crosses the threshold level of the high level up detector 21. This sequence can be recognized by special recognition circuitry (not shown) which will generate a first bit signal. Thereafter, data detection proceeds as described above. The recognition of the first bit is also supplied to the self-clocking circuitry described in the aforereferenced copending application of Cecil Wayne Cox et. al. which prevents any high level detected noise signal from being recognized as data.

As is apparent from the foregoing description, the multiple threshold level detection is utilized to reject spurious noise signals which exist between blocks of information while insuring proper detection for self-clocked binary information. In the embodiment described, four threshold level detector circuits were utilized to detect respectively, two threshold levels of a positive going signal and two threshold levels of a negative going signal. As is apparent to those skilled in the art, a single threshold level detector could be utilized to detect the zero crossover therefore replacing the multiple low level threshold detectors.

Further, the output signals of the high level detectors could be directly sampled by the output signal of the single shot 41. If neither high level detector was on at the sample time, a noise error signal similar to that supplied by coincidence circuit 43 would result. A further modification would be to utilize a single high level detector responsive to both polarities of input signals.

While the invention has been particularly shown and described with reference to a preferred embodiment thereof, it should be understood by those skilled in the art, that the foregoing and other changes in form and detail may be made therein without departing from the scope of the invention.

I claim:

1. A data detection and noise separation system for detecting binary information occurring periodically in an electrical pulse signal wave form and for separating the periodic binary information pulses from noise signal pulses occurring within the wave form between groups of binary information pulses comprising:

differentiating means for differentiating the electrical pulse signal to produce a differentiated signal in which the zero crossovers of the differentiated signal correspond to the signal peaks of the electrical pulse signal wave form;

first threshold level detection means responsive to the output signal of the differentiating means for detecting the zero crossovers of the differentiated signal and for providing an output signal for each such zero crossover;

second threshold level detection means responsive to the output signal of the differentiating means for providing an output signal whenever the differentiated signal exceeds a second predetermined level;

delay means responsive to the output signal of the first threshold level detection means for delaying said output signal by a predetermined time interval;

noise rejection means responsive to the output signal of said delay means and to the output signal of said second threshold level detection means for providing a signal output when said second threshold level detection means fails to provide an output signal prior to the occurrence of the output signal of said delay means;

clock pulse generating means responsive to said first threshold level detection means for generating periodic clock pulses corresponding to said binary data information and aperiodic pulses corresponding to noise pulses;

data recognition means responsive to said clock pulses for detecting the binary information of the signal wave form and responsive to the output signal of said noise rejection means for inhibiting the detection of said binary information initiated by said clock pulses.

2. The data detection and noise separation system of claim 1 wherein the second threshold level detection means continues to provide an output signal until said first threshold level detection means detects a subsequent zero crossover.

3. The data detection and noise separation system of claim 1 wherein said first threshold level detection means comprises two threshold level detection circuits, one of said circuits providing an output signal whenever said differentiated signal goes positive and the other of said circuits providing an output signal whenever said differentiated signal goes negative.

4. The data detection and noise separation system of claim 3 wherein said second threshold level detection means comprises two threshold level detection devices, one of said devices providing an output signal whenever said differentiated signal exceeds a positive threshold level greater than the threshold level of the positive threshold level detection circuit, the other of said devices providing an output signal whenever said differentiated signal exceeds a negative threshold level greater than the threshold level of the negative threshold level detection circuit.

5. The data detection and noise separation system of claim 4 wherein said second threshold level detection devices continue to provide an output signal as long as their corresponding first threshold level detection circuit provides an output signal.